Dec. 14, 1971   F. L. LOEFFLER   3,626,773
SELF-CLEANING PULLEY
Filed May 6, 1970

INVENTOR
Fredrick L. Loeffler

BY J. W. Douglas
his atty

United States Patent Office 3,626,773
Patented Dec. 14, 1971

3,626,773
SELF-CLEANING PULLEY
Fredrick L. Loeffler, 18016 Norwell Ave.,
Cleveland, Ohio 44135
Filed May 6, 1970, Ser. No. 35,124
Int. Cl. F16h 57/04
U.S. Cl. 74—230                                   7 Claims

ABSTRACT OF THE DISCLOSURE

A self-cleaning pulley having a shaft with screw means mounted thereon. A belt engaging surface is provided by members disposed on the outer periphery of the screw means. The belt engaging surface has continuous circumferentially and transversely extending portions to provide continuous circumferential and transverse contact with the belt.

BACKGROUND OF INVENTION

This invention relates generally to pulleys for engagement with conveyor belts, and more particularly to self-cleaning pulleys which will clean themselves of material which passes through the conveyor belt and comes into contact with the pulley.

One of the problems encountered with pulleys which drivingly engage conveyor belts, which belts are of open type construction, is that in the conveying of certain types of material on these belts, portions of the material tend to pass through the conveyor belt and clog the pulley which is in driving engagement therewith.

There have been several prior art proposals for self-cleaning pulleys, none of which has proved entirely satisfactory. One such prior art proposal has utilized a central screw with sprocket means at the ends thereof drivingly engaged with links on the outer edge of the belt. While such construction has proved quite satisfactory from a cleaning standpoint, nevertheless the engagement of the pulley with the belt is limited to the outer edges thereof, and then only by a specially constructed sprocket and chain engagement. Thus, special belts of the exact width are required, and special drive mechanisms are also required which add considerably to the expense of the belt and the pulley. Also, only the outer edges are in driving engagement which sacrifices the axial length of the pulley which could well be employed in such engagement for driving the pulley, but for the fact that there are screw means thereon.

Another type of prior art proposal has utilized sloping planes extending from the central portion of the shaft outward to the edge thereof with a plurality of transversely extending bars extending parallel to the axis of the pulley for engagement with the belt. While such a construction utilizes the entire width of the pulley, the sloping planes are not completely satisfactory to move the material to the edge thereof. Further, the transversely extending bars do not provide a smooth engagement with the belt but rather provide intermittent engagement and disengagement which causes a bumping or vibrating type movement as the pulley drives the belt.

Other types of self-cleaning pulleys have other drawbacks and none have proved entirely satisfactory.

SUMMARY OF THE INVENTION

According to the present invention, a self-cleaning pulley is provided which has material moving means disposed on a central shaft and a belt engaging surface surrounding said material moving means. The belt engaging surface drivingly engages a conveyor belt and is formed of continuous circumferentially and transversely extending portions defining therebetween openings communicating with the central material moving means.

DESCRIPTION OF THE PREFERRED EMBODIMENT

Figure 1:
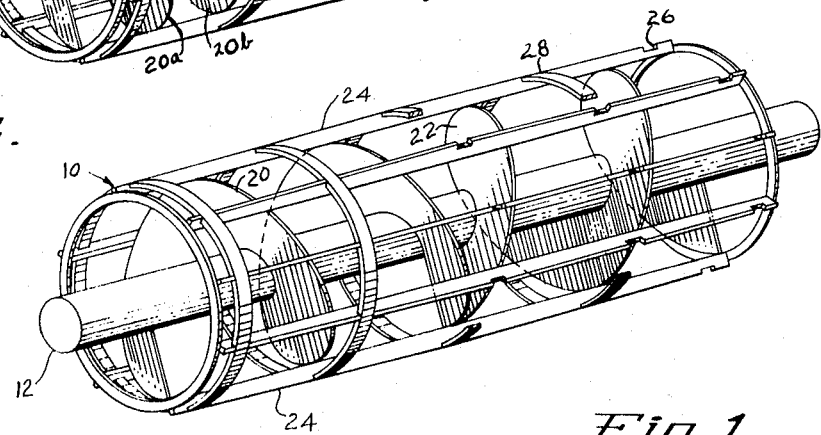
FIG. 1 is a perspective view partially in section with parts broken away for clarity, showing one embodiment of a self cleaning pulley according to this invention.
Figures 2, 3:
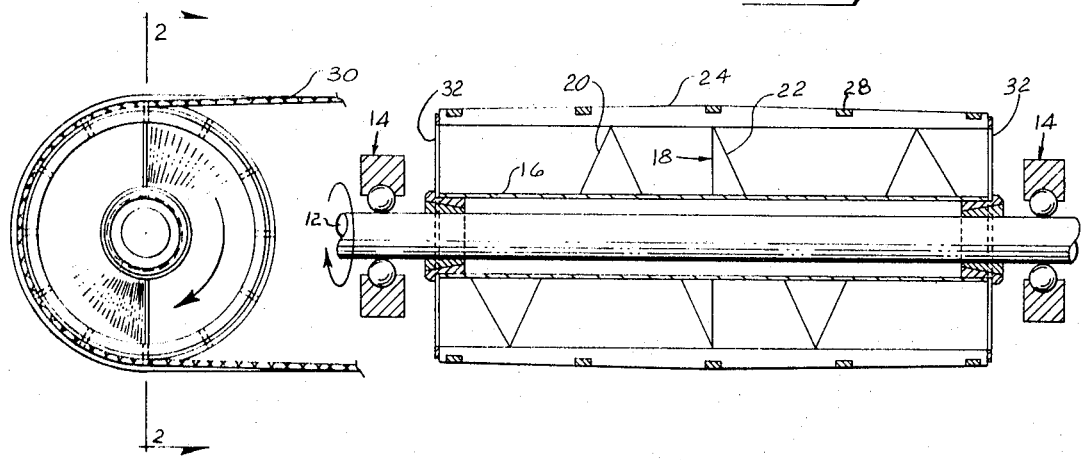
FIG. 2 is a longitudinal sectional view along the plane 2—2 of FIG. 3 with parts shown schematically.
FIG. 3 is an end elevational view of the pulley of FIG. 1 drivingly engaging a conveyor belt.

Referring now to the drawing, and for the present FIGS. 1 through 3, a self-cleaning pulley is shown and designated generally as 10. The pulley 10 includes a central shaft 12 which is disposed to be mounted in suitable bearings 14 at opposite ends thereof.

Mounted on the shaft 12 is a sleeve 16, which sleeve 16 mounts material moving or material transport means designated generally as 18. The material transport means takes the form of a pair of screws 20 and 22 disposed at opposite ends of the sleeve 16. The screw 20 is a left-hand thread screw and is disposed to move the material to the left as shown in FIG. 2, and the screw 22 is a right-hand screw disposed to move the material to the right as shown in FIG. 2, when the pulley is rotated in the direction designated by the arrows in FIG. 2.

Disposed on the outer periphery of the screws 20 and 22, and secured thereto as by welding, are plurality of transversely extending bars 24 which are circumferentially spaced around the screws 20 and 22. The transversely extending bars 24 are each provided with slots 26. The slots in the spaced bars 24 are aligned to receive a plurality of circumferentially extending bands 28. The bands 28 are disposed in the slots 26 and are preferably secured to the bars 24 as by welding. The bars 24 and bands 28 together define an outer pulley engaging surface which has continuous circumferentially extending and continuous transversely extending portions so that when the pulley 10 is drivingly engaged with a conveyor belt, designated as 30, as shown in FIG. 3, there will be a continuous surface in contact with the belt and not a series of discontinuous bars alternately engaging and disengaging. This continuous surface which is in contact with the belt 30 provides openings through which material falling from the conveyor belt can pass, the material falling to the center of the pulley where it is engaged by either the screw 20 or screw 22. The rotation of the pulley will cause an augering type action of the screws 20 and 22 which will move the material to the opposite ends of the sleeve 16 where it will be discharged from the pulley. Thus, the pulley will not clog with material which collects therein from the conveyor belt, but will maintain itself clean during operation.

In order to prevent inward collapsing or bending of the ends of the transverse bars 24, reinforcing rings 32 are provided at the opposite ends thereof, which rings are secured to the bars 24, preferably by welding. The bars 24, bands 28 and rings 32 together provide a rigid outer shell which is resistant to deformation and collapse across the entire length thereof.

Figure 4:
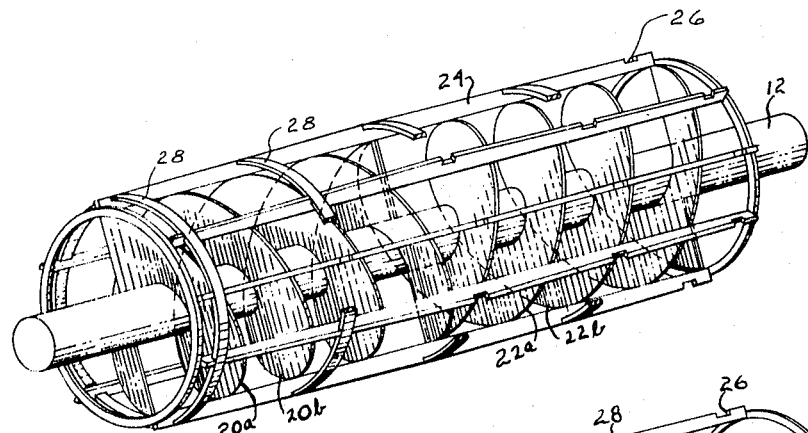
FIG. 4 is a perspective view of another embodiment of a self cleaning pulley according to this invention.

In certain applications, a great deal of material is likely to pass through the conveyor belt to the pulley, thus requiring rather rapid movement of the material to the ends thereof so that there will not be any excess accumulation of material. The maximum rate of movement of the material will depend upon the pitch length and the pitch angle of the screws 20 and 22. A certain optimum pitch angle and pitch length will produce maximum material movement. However, if such movement is not sufficient, a double screw construction can be employed, such as shown in FIG. 4. In FIG. 4 the pulley is the same as FIG. 3 except that a pair of left-hand screws 20a and 20b are provided on the left side, and a pair of right-hand screws 22a and 22b are provided on the right hand side of the pulley. This allows each screw to be formed to the optimum pitch length and angle, and by doubling the screws double the rate of movement of the material. Thus, the construction shown in FIG. 4 greatly increases the amount of material movement over that allowed by the construction of the pulley of FIGS. 1 through 3.

It is to be understood that other types of screw constructions could also be employed other than those shown in FIGS. 1 through 3, and FIG. 4. In these figures, opposite hands of screws are employed set opposite ends of the shaft. These will move the material rapidly. However, these pulleys must be properly oriented since they will operate to move the material toward the ends of the shaft in only one direction of rotation. For operation in either direction of rotation, a single screw extending the entire length of the sleeve could be employed having either a right-hand thread or left-hand thread, in which case the material would all move to one end. This, however, would not be as efficient for material movement as the opposite screw construction at opposite ends, wherein material is moved from the center toward both ends.

It is also to be understood that other types of structures could be used to form the pulley engaging surface. For example, bars and/or bands could be arranged on the surface of the screw means so that they would extend diagonally intersecting each other so as to form diamond-shaped openings in the surface rather than rectangular openings. Other types of arrangements of the bars and/or bands can be provided to have other types of surface segments on opening configurations. The critical feature is that there be a continuous transversely extending surface means and continuously extending circumferentially surface means and whether these surface segments extend exactly laterally or exactly circumferentially or whether they extend angularly or arcuately is not important from a functional point of view. While the preferred embodiment provides a construction which is relatively simple to make and can be assembled inexpensively, these other constructions function effectively.

What is claimed is:

1. A self-cleaning pulley comprising, a central shaft, means mounted on said shaft to transport material toward at least one end of said shaft means upon rotation thereof and open at at least one end thereof, a belt engaging surface surrounding said material transporting means disposed to drivingly engage a conveyor belt, said belt engaging surfaces having continuous circumferentially and transversely extending surface portions defining therebetween openings communicating with said shaft mounted means.

2. The invention as defined in claim 1 wherein said material transport means includes screw means.

3. The invention as defined in claim 2 further characterized by said screw means including first and second screws of relatively the same pitch and hand, and being co-extensive on said shaft.

4. The invention as defined in claim 2 wherein said belt engaging surface is defined by intersecting transversely extending and circumferentially extending support segments.

5. The invention as defined in claim 2 wherein said screw means includes two segments of opposite hand in end-to-end relationship.

6. The invention as defined in claim 2 wherein the screw means is of the same hand for the entire length thereof.

7. The invention as defined in claim 1 further characterized by reinforcing means at opposite ends of said pulley.

References Cited
UNITED STATES PATENTS

| | | | |
|---|---|---|---|
| 3,055,229 | 9/1962 | Mecham | 74—230 |
| 3,507,160 | 4/1970 | McPherson et al. | 74—230 X |

LEONARD H. GERIN, Primary Examiner